United States Patent [19]

Salter et al.

[11] Patent Number: 5,464,578
[45] Date of Patent: Nov. 7, 1995

[54] METHOD OF MAKING A COMPACT FLUID COUPLER FOR THERMAL INKJET PRINT CARTRIDGE INK RESERVOIR

[75] Inventors: James G. Salter, Columbus, Ga.;
James E. Clark, San Diego, Calif.;
David W. Swanson, Escondido, Calif.;
George F. Nasworthy, Leucadia, Calif.

[73] Assignee: Hewlett-Packard Company, Palo Alto, Calif.

[21] Appl. No.: 853,372

[22] Filed: Mar. 18, 1992

[51] Int. Cl.[6] .................. B29C 45/14; B29C 45/16; B29C 70/72
[52] U.S. Cl. .................. 264/250; 264/255; 264/259; 264/274; 264/275
[58] Field of Search ................ 264/271.1, 259, 264/132, 279.1, 230, 275, 255, 250, 274; 425/121, 129.1, 577

[56] References Cited

U.S. PATENT DOCUMENTS

| | | | |
|---|---|---|---|
| 2,716,623 | 8/1955 | Tator | 264/263 |
| 4,289,721 | 9/1981 | Ishise | 264/255 |
| 4,422,995 | 12/1983 | Schad | 264/259 |
| 4,662,045 | 5/1987 | Grödum | 264/271.1 |
| 4,876,915 | 10/1989 | Iuchi | 264/271.1 |
| 4,898,706 | 2/1990 | Yabe et al. | 264/259 |
| 5,078,817 | 1/1992 | Takagaki | 264/230 |
| 5,164,134 | 11/1992 | Durand | 264/154 |

OTHER PUBLICATIONS

Hewlett–Packard Journal, vol. 36, No. 5, May, 1985.
Hewlett–Packard Journal, vol. 39, No. 4, Aug., 1988, pp. 1–56.

*Primary Examiner*—Jan H. Silbaugh
*Assistant Examiner*—Angela Ortiz

[57] ABSTRACT

A method for joining two materials together to form a compact leak-resistant seal, particularly suited for use in thermal inkjet print cartridge ink reservoirs. The seal employs a shrink fit to clamp the two materials together. The method includes the steps of forming the first material into a desired first shot structure, placing the first shot structure in a second shot mold, and injecting the second material into the mold under adequate pressure and at an appropriate temperature. The second material has a high degree of mold shrinkage. Upon cooling, the second material shrinks tightly onto the first shot structure to form a molded joint which keeps air out and ink in when wetted and during normal shipping, storage, and operating conditions.

4 Claims, 3 Drawing Sheets

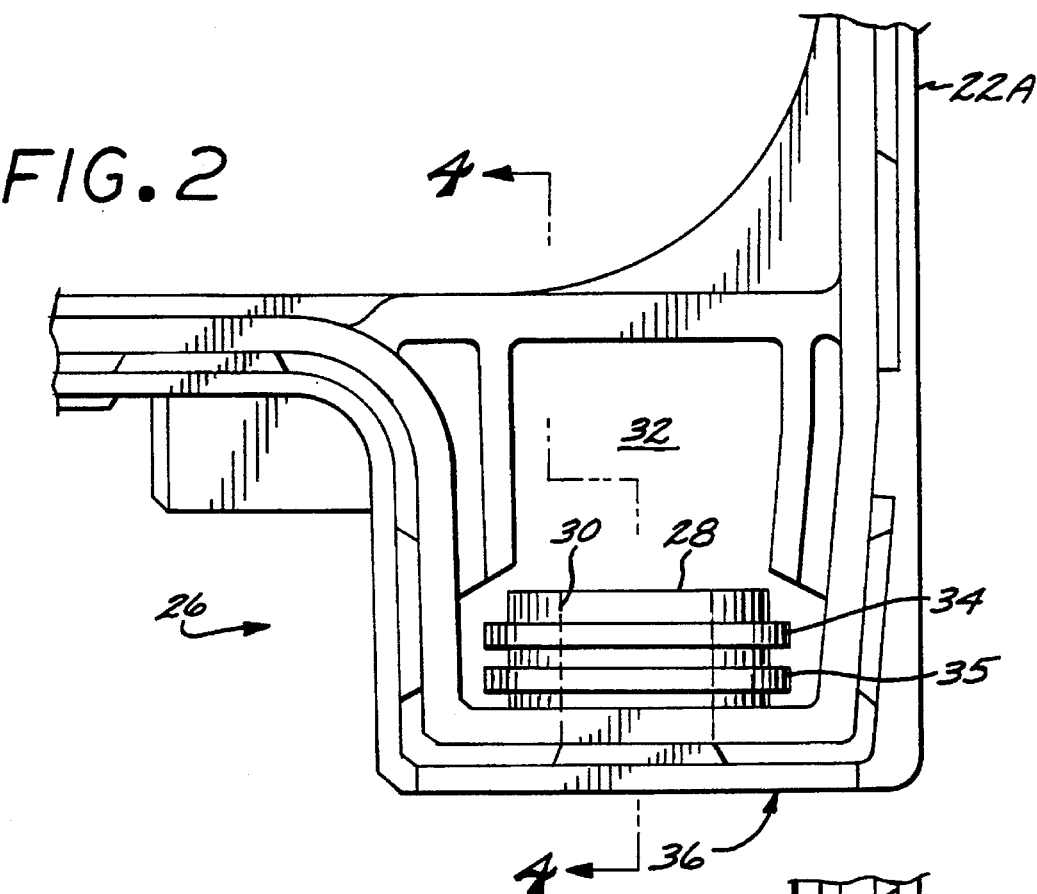
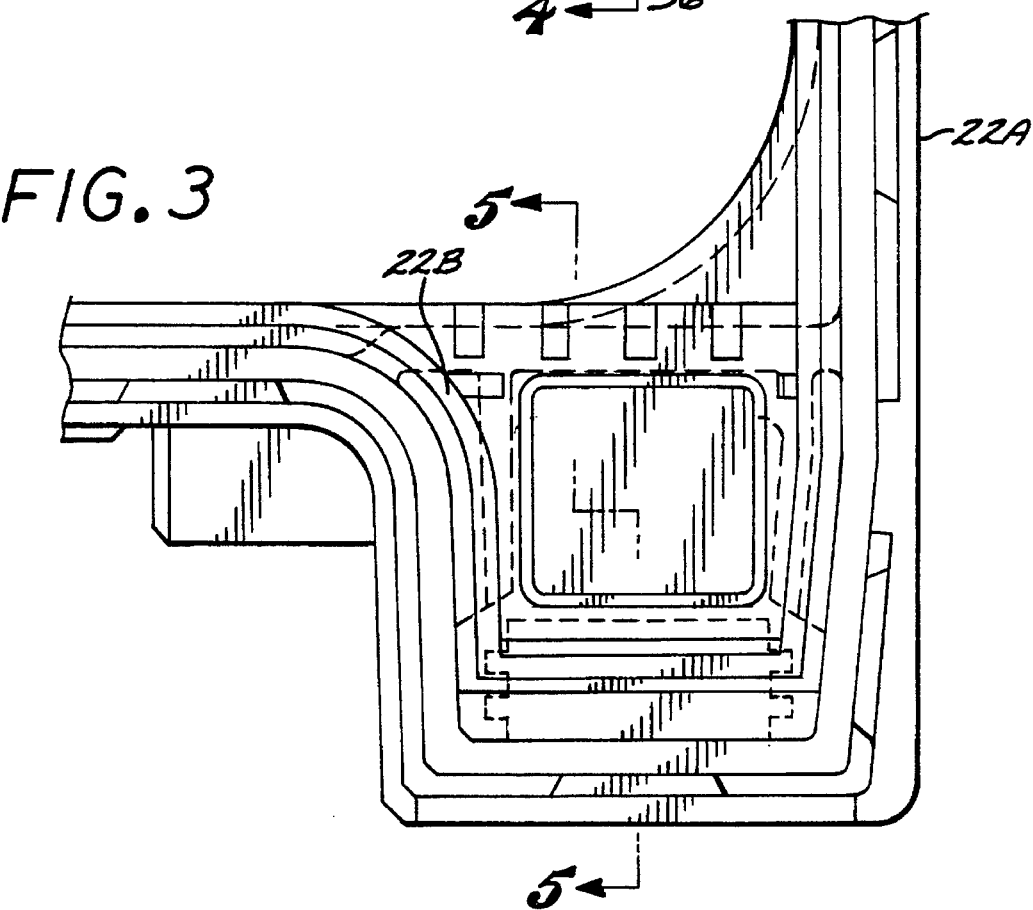

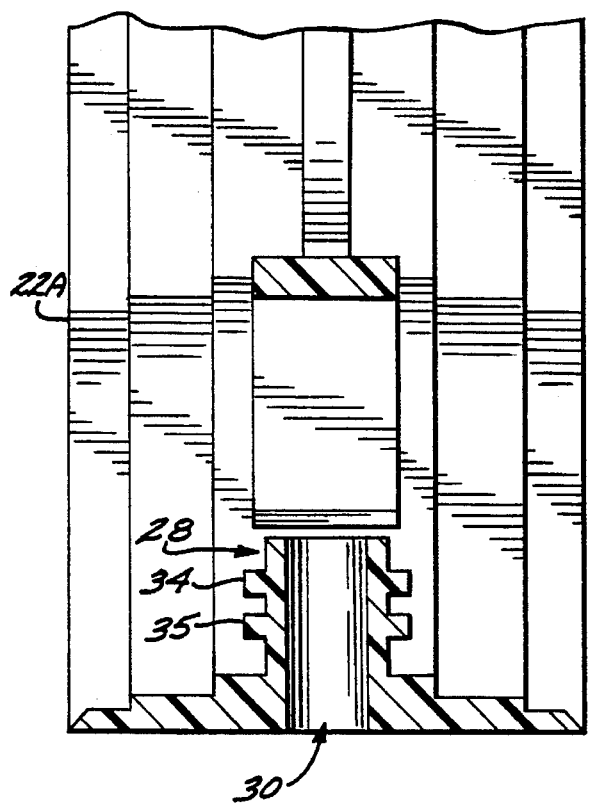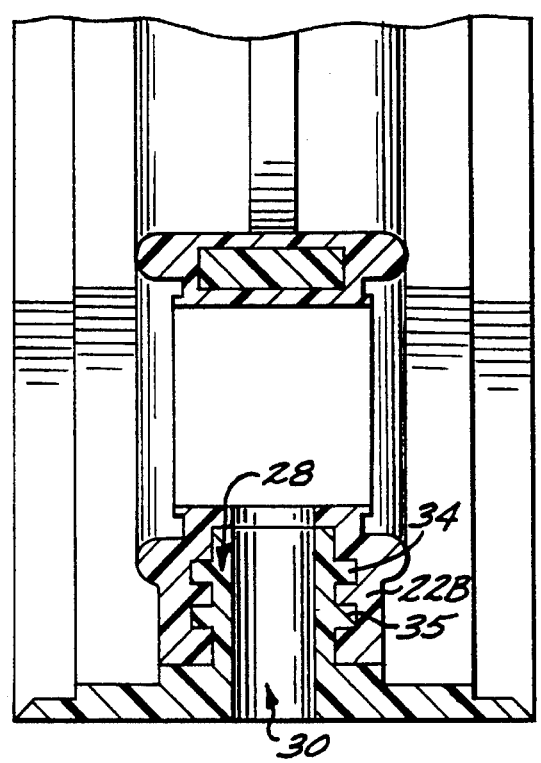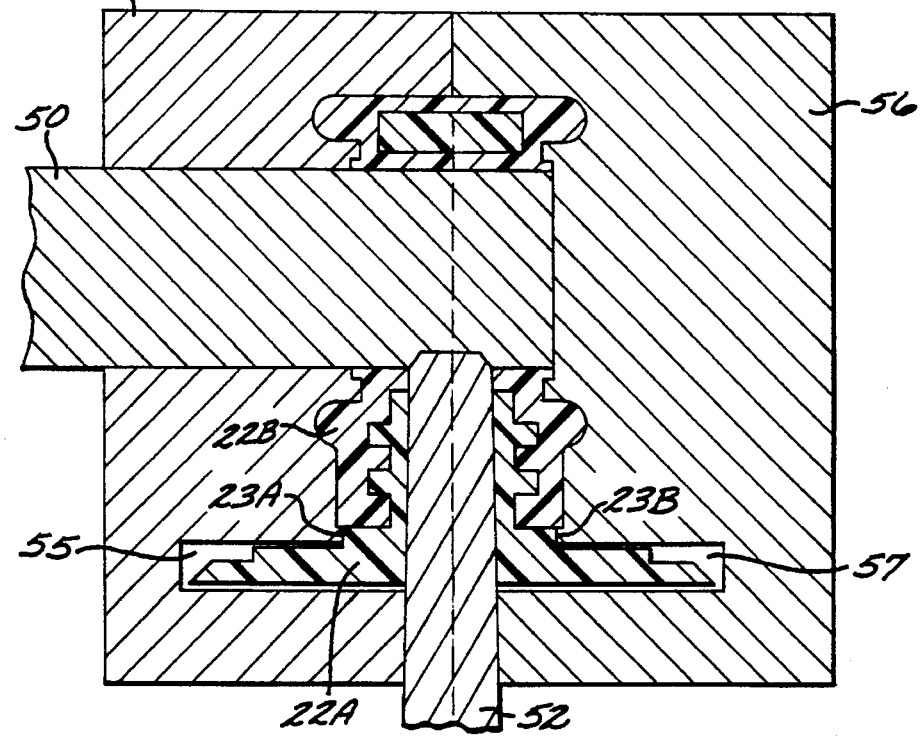

METHOD OF MAKING A COMPACT FLUID COUPLER FOR THERMAL INKJET PRINT CARTRIDGE INK RESERVOIR

BACKGROUND OF THE INVENTION

This invention relates to ink reservoirs for thermal ink jet ("TIJ") print cartridges.

TIJ technology is widely used in computer printers. Very generally, a TIJ includes a print head typically comprises several tiny controllable ink jets, which are selectively activated to release a jet or spray of ink from an ink reservoir onto the print media (such as paper) in order to create an image or portion of an image. TIJ printers are described, for example, in the Hewlett-Packard Journal, Volume 36, Number 5, May, 1985, and Volume 39, Number 4, August, 1988.

In TIJ pens it is necessary to connect the ink reservoir to the print head. The size of this connection affects the design of the printer that the pens are used in. An ideal reservoir-to-print-head coupler, from a printer design point of view, would be no longer than the TIJ head is long, and would be high or tall enough to allow the drive and pinch wheels to get as close to the print head as possible. Any increase in the size of this coupler will compromise the paper handling ability, which may affect the print quality, and increase the size of the printer. Smaller printers are desirable as they conserve desk space and the materials from which the printer is fabricated.

An intended application for this invention is for a spring bag TIJ pen, although it is not limited to the spring bag pen. In one exemplary spring bag pen design, the pen frame made of a first molded material is lined with a second molded material, such as polyethylene, on the inside to produce a surface suitable for staking the films of the spring bag. The first molded material from which the frame is made could be, for example, an engineering plastic, and provides the necessary structure for the pen which could not be accomplished with the second molded material. This invention relates to the fluid connection of the first and second molded materials in such a way as to provide a space-efficient, leak-resistant connection.

Conventional methods of connecting materials include the use of glue, seals, such as gaskets or 0-rings, or mechanical press fits. In these cases two or more separate parts are fabricated and assembled together to form a single unit. Each part must be designed and sized with respect to its needs in manufacturing, structural integrity, and with the tolerance of the mating part in mind. Such joints as these take up much more space than joints fabricated in accordance with this invention. In addition to taking up much space, the traditional methods produce a joint whose reliability can be affected by the part tolerances, surface finishes, and the assembly operation. The method of this invention provides a joint which is less susceptible to surface finish defects than joints obtained by such traditional methods.

SUMMARY OF THE INVENTION

A thermal inkjet print cartridge ink reservoir in accordance with the invention is characterized by a compact, leak-resistant joint between first and second moldable materials which define the frame of the reservoir. The reservoir includes a first frame element having a snout end and defining an interior standpipe member through which a channel opening extends. The channel opening extends between the ink reservoir chamber and a thermal inkjet print head. The first frame element is fabricated from a first moldable plastic.

The ink reservoir includes a second frame element fabricated from a second moldable plastic material characterized by a shrink rate as the material cools from a molten state. The second frame element is formed by injection molding and surrounds the periphery of the standpipe member to thereby provide the compact, leak-resistent joint, in that the second moldable material has shrunk about the periphery of the standpipe member to define the joint.

A method in accordance with this invention is for forming a leak-resistant joint between first and second moldable materials, and includes the following steps:

molding the first material into a predetermined first shot structure defining an interior fluid standpipe through which a channel opening extends;

positioning the first shot structure in a second shot mold;

injecting the second moldable material in a molten state into the mold as a second shot wherein the second material surrounds the standpipe member, the second material characterized by a shrink rate as the material cools; and permitting the second material to cool, whereupon the second material shrinks about the periphery of the standpipe, thereby forming a leak-resistant seal between the first and second materials about the standpipe.

Use of this method to join the two materials allows the surface of the first shot to be used, as molded, and the molding negates the effects of the tolerance and surface finish of the second molded material on the joint. When the second molded material is molded onto the first molded material it shrinks as it cools and produces a tight joint.

This method of connection is more reliable than conventional methods. Since the second molded material, e.g., polyethylene, is molded onto the first molded material, which can be used as a structural element, the first molded material imparts stiffness to the second molded material. The second molded material therefore can be designed to be thinner in cross section than if the part were made by conventional methods. Because the second molded material is never handled as a separate part on an assembly line, as would be the case in a traditional two-part design, its cross sections are not burdened by the stiffness that handling would require, and therefore the design is more compact from this perspective also.

BRIEF DESCRIPTION OF THE DRAWING

These and other features and advantages of the present invention will become more apparent from the following detailed description of an exemplary embodiment thereof, as illustrated in the accompanying drawings, in which:

FIG. 2 is a close-up view of the snout region of the rigid engineering plastic member comprising the ink reservoir of FIG. 1.

FIG. 3 is a close-up view of the snout region of the ink reservoir of FIG. 1, showing both the rigid plastic member and the polyethylene member comprising the ink reservoir.

FIG. 4 is a cross-sectional view taken along line 4—4 of FIG. 2.

FIG. 5 is a cross-sectional view taken along line 5—5 of FIG. 3.

FIG. 6 illustrates the second "shot" process in which the polyethylene member comprising the frame of the ink reservoir is molded.

DETAILED DESCRIPTION OF THE PREFERRED EMBODIMENT

Figure 1:
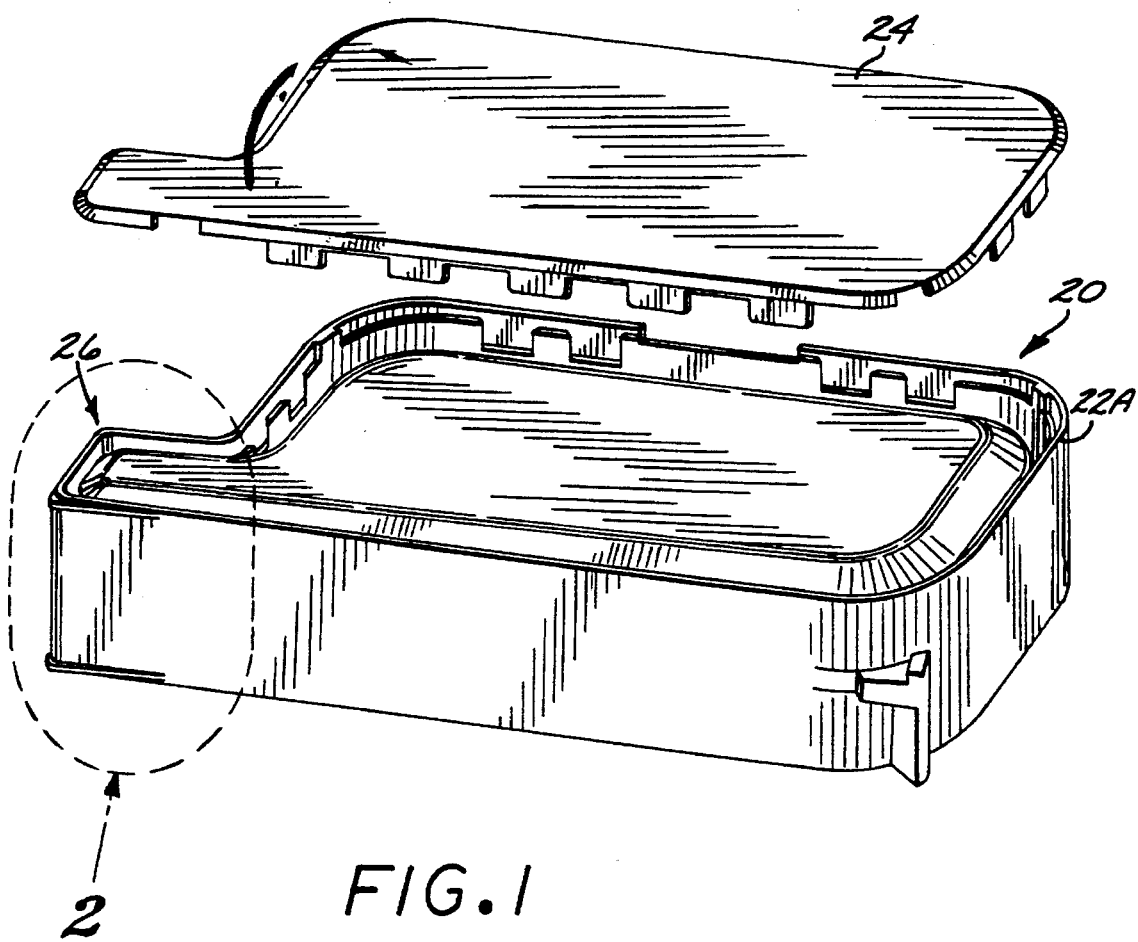
FIG. 1 illustrates a thermal inkjet print cartridge ink reservoir embodying the present invention.

FIGS. 1–6 illustrates a compact thermal inkjet print cartridge ink reservoir 20 in accordance with this invention. In this exemplary embodiment, the backbone or frame 22 of the reservoir 20 comprises two chemically dissimilar plastics, an engineering plastic, e.g., a glass-filled modified polyphenylene oxide (such as the material sold under the trademark "NORYL"), and 10 percent glass-filled polyethylene, which are molded one onto the other to form a leak-resistant joint in accordance with this invention. The frame 22 is stiffened by a pair of sheet metal covers 24 (only one of which is visible in FIG. 1) which attach to its sides. This structure of frame 22 and covers 24 is intended for use with a spring bag ink delivery system of the type described in pending U.S. patent application Ser. No. 07/717,735, filed Jun. 19, 1991, now U.S. Pat. No. 5,359,353 entitled "Spring-Bag Printer Ink Cartridge with Volume Indicator," by David S. Hunt and W. Bruce Reid and assigned to a common assignee with the present invention. A print head (not shown) is connected at the snout end 26 of the reservoir for selectively releasing a jet of ink from the reservoir.

In accordance with the invention, the seal between the two dissimilar materials comprising the frame 22 employs a shrink fit at the container snout end to clamp the two plastics tightly together. FIG. 2 illustrates the snout end 26 of the reservoir 20 in its form prior to molding the polyethylene 22B onto the engineering plastic frame member 22A. The member 22A is an integrally formed frame member molded of the engineering plastic. At the snout end 26, the member 22A defines an interior, upright fluid standpipe 28 having an interior opening 30 defined therein which extends through the standpipe to an opening formed in the exterior surface of the frame member 22A. It is through this opening that the ink will flow from the reservoir. The ink jet head (not shown) will be positioned along the surface 36.

The end 26 of the member 22A is shown in further detail in the cross-sectional view of FIG. 4. FIG. 2 illustrates the open region 32 surrounding the upwardly extending fluid standpipe 28 within the frame 22A. A pair of spaced ribs 34 and 35 protrude from the exterior side of the standpipe 28.

Now referring to FIGS. 3 and 5, the reservoir frame 22 is shown with the polyethylene layer 22B molded to the inside surface of the frame 22A. The layer 22B in the region 26 is best illustrated in the cross-sectional view of FIG. 5. The polyethylene material 22B has been molded around the periphery of the standpipe 28, without covering the opening 30. The polyethylene material 22B provides a surface to which the spring bag film may be staked. It is therefore important that there be no leaks between the standpipe 28 and the surrounding molded layer of polyethylene, as this would defeat the integrity of the reservoir, and permit ink to leak from the reservoir, or air to get into the reservoir.

The method of molding the layer 22B to the frame element 22A is now described. First, the frame element 22A of modified polyphenylene oxide, i.e., a first molded material, is fabricated in a plastic injection mold. This part 22A, referred to as the "first shot," is illustrated in FIGS. 2 and 4. The first shot 22A is next inserted into a second mold, where the polyethylene 22B, i.e., the second molded material, is molded onto it. The polyethylene is injected into the mold under appropriate pressure and at an appropriate temperature. For polyethylene, an exemplary pressure is in the range of 4,000 to 10,000 psi, and an exemplary melt temperature is 400° F. This polyethylene "second shot" has a degree of mold shrinkage (such as, for high density polyethylene without glass, about 0.022 inches/inch); upon cooling, the polyethylene material shrinks tightly onto the ribs of the first shot. Thus, the necessary property of the second molded material is that it shrinks during the cooling process.

FIG. 6 illustrates the second shot molding process. A cavity mold pin 50 is extended above the top of the channel 30. The cavity mold pin 50 is attached to and moves with the mold half 54. A channel cavity mold pin 52 is inserted into the channel opening 30 formed in the frame member 22A and against the cavity mold pin 50. The mold halves 54 and 56 are closed together, defining the interior opening into which the molten polyethylene is injected or "shot," together with surfaces of the first molded material. Thus, according to another aspect of the invention, the mold cavity for the second shot is partially defined by surfaces of the first shot, i.e., the first molded material. Surfaces of the frame member 22A serve as stop surfaces against which the respective mold halves bear when the mold is closed to stop the flow of the molten second material. Thus, in FIG. 6 surfaces 23A and 23B of the frame member 22A are contacted, or brought in close proximity, such as 0.001 inch or less, by corresponding surfaces of the mold halves 54 and 56, and prevent flow of the second material into the mold cavities generally indicated by 55 and 57.

After the second "shot" of polyethylene is cooled, forming the polyethylene member 22B, the mold halves 54 and 56 are separated. The mold pin 52 is withdrawn during mold separation.

The molded joint resulting from this invention retains water and thermal inkjet printing inks, and keeps air out under moderate pressure and vacuum, through a range of environmental conditions normally experienced by office products. The internal stresses inherent to the second shot, as it shrinks about the standpipe, keep it from pulling away from the first shot. The mold and first shot material, which are at a lower temperature than the second shot molding temperature, cool the second shot material. When the polymer passes through its glass transition temperature, it changes phases from liquid to solid. When in the solid state the plastic temperature continues to drop from its glass transition temperature $T_g$ to the mold temperature, e.g., where $T_g$ is on the order of 300° F. and the mold temperature is on the order of 100° F. The thermal contractions during this part of the cooling process results in the formation of internal stresses in the now solid second shot.

The process of this invention is applicable to multicavity molding and also two-shot molding, where both plastics are injected during different cycles of the same molding machine. As is well known in the art, multi-cavity molds are used to produce as many parts per cycle as there are cavities in the mold.

Pressure decay leak-testing of parts fabricated using this seal show minimal leak rates. Further, the seal has proven to endure throughout the print cartridge assembly process, during which the ink reservoir is subjected to mechanical and thermal stresses. The seal has been tested successfully with various ribs and different plastic materials, such as polysulfone for the first shot, i.e., the first molded material, and glass-filled polyethylene as the second shot, i.e., the second molded material. Other materials may be suitable for the first and second molded materials.

The joint created by the method of the present invention is resistent to air leaks into the reservoir and ink leaks out of the reservoir, i.e., it is resistent to the leakage of air into the closed ink reservoir via the joint at the materials interface at the standpipe, and to the leakage of ink out of the interface via the joint. The joint is of value even if not air-tight, as it would be necessary for air to bubble through the interface formed by the materials of the first and second shots wetted by ink via a bubble generator effect. Air would bubble through the interface only under a pressure differential well above conditions likely to be faced by an ink jet cartridge.

While the standpipe described above has two ribs, such ribs are not necessary for the joint to properly function as a leak-resistent joint. The ribs do add leak-resistent margin by making the capillary path that the ink must travel to leak out more tortuous, and therefor adds to the energy necessary for the ink to leak. However, some applications may not allow the use of such ribs, and the joint without ribs is still leak-resistent.

While the preferred embodiment has employed dissimilar plastic materials as the first and second molded materials, that is not necessary to obtain a leak-resistent joint with the invention. In fact, in particular applications, the same material can be used for both materials, so long as the material is characterized by the property that it shrinks upon cooling from the liquid state to the solid state.

The first shot material is typically characterized by a higher melting temperature than the second shot material. The first shot material could be compounded or non-compounded relative to the virgin base material. In this context a "compounded" material is one in which additives such as glass bead, glass fiber, talc, metal particles, or the like have been blended with the base material. For example, compounded materials suitable for use as the first shot material include 20% glass-filled modified polyphenylene oxide or glass-filled polysulfone. Polyethylene terephthalate (PET), either filled or non-filled, is also suitable for use as the first shot material.

The second shot material preferably has a melting point which is equal to or less than the melting temperature of the first shot material, although in some applications a second shot material with a higher melting temperature than the first shot could be used. The second shot material can be compounded or non-compounded material, such as glass-filled or non-glass-filled polypropylene, or the like, or even glass-filled or non-glass-filled polysulfone.

An advantage gained from this invention is the ability to attach the two plastic parts without an intermediate assembly step. Each plastic material is specified for its unique properties in different aspects of print cartridge reservoir assembly and operation; previously such a combination had to be fabricated separately and then joined. Using this seal, no assembly equipment is required, only one part need be handled, and there is no yield loss associated with imperfect joints. The two plastic components are attached to each other without resorting to devices such as snap fits, screw holes, etc., which would take up additional space; instead, all of the space in the ink reservoir is utilized for attachment of the covers and the spring bag films, ensuring adequate stiffness and making effective use of the available space for storing ink.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A method for forming a compact, leak-resistant joint between first and second moldable materials which define the frame of an ink-jetprint cartridge, the first material comprising a moldable rigid plastic and the second material comprising a moldable plastic characterized by a shrinkage rate as said second material cools, comprising a sequence of the following steps:

molding said first material into a predetermined first shot reservoir frame structure defining at a snout end thereof an interior standpipe member through which a channel opening extends, said channel opening for carrying ink in a liquid state from an ink reservoir to a printhead region of said cartridge;

positioning said first shot structure in a second shot mold, said mold comprising first and second mold halves which can be closed about said first shot structure and define a portion of one or more mold cavities into which said second material is injected under pressure, and which can be opened upon cooling to permit removal of a molded structure therefrom, wherein a portion of said first shot structure also defines a portion of said one or more mold cavities, and wherein the second shot mold is provided with a channel mold pin for extending through said channel opening to prevent said second material from entering said channel during a second shot molding step, and with a cavity mold pin which extends across said channel opening, said channel mold pin stopping against said cavity mold pin;

injecting said second moldable material in a molten state into said mold as a second shot wherein said second material surrounds said standpipe member, said second material having a shrinkage rate as said material cools, and wherein said first shot structure comprises one or more shutoff surfaces against which said mold halves bear when closed about said first shot structure, and thereby shuts off a path for said molten second moldable material to flow when injected into said mold;

permitting said second material to cool, whereupon said second material shrinks about the periphery of said standpipe member, thereby forming a leak-resistant seal between said first and second materials about said standpipe, said seal resistant to leaks of said liquid ink out of said standpipe and resistant to air leaks through said seal into said reservoir.

2. The method of claim 1 wherein said first shot structure is characterized by one or more protruding peripheral ribs extending outwardly from said standpipe member, wherein said second material is molded about said one or more ribs.

3. The method of claim 1 wherein said first material is a modified polyphenylene oxide, and second material is a glass-filled polyethylene.

4. The method of claim 1 wherein said first material is polysulfone and said second material is glass-filled polyethylene.

* * * * *